United States Patent [19]

Suzuki

[11] Patent Number: 5,596,484
[45] Date of Patent: Jan. 21, 1997

[54] MOUNTING DEVICE FOR MOUNTING A SMALL ELECTRONIC DEVICE IN A SPACE FOR A LARGER ELECTRONIC DEVICE

[75] Inventor: Yuji Suzuki, Kanagawa, Japan

[73] Assignee: Sony Corporation, Tokyo, Japan

[21] Appl. No.: 836,807

[22] Filed: Feb. 19, 1992

[30] Foreign Application Priority Data

Feb. 22, 1991 [JP] Japan .................................. 3-050515

[51] Int. Cl.⁶ .............................. H05K 5/00; G06F 1/16
[52] U.S. Cl. .......................................... 361/685; 369/75.1
[58] Field of Search ................................. 369/75.1, 77.2;
360/137; 361/380, 391, 393, 384, 417,
427, 685, 679; 364/708; 248/27.1, 27.3,
639, 672, 674, 675

[56] References Cited

U.S. PATENT DOCUMENTS

| | | | |
|---|---|---|---|
| 4,498,123 | 2/1985 | Fuss et al. | 361/427 |
| 4,633,350 | 12/1986 | Hanson | 369/75.1 |
| 4,688,131 | 8/1987 | Noda et al. | 360/137 |
| 4,894,739 | 1/1990 | Kobayashi | 360/97.02 |
| 4,912,580 | 3/1990 | Hanson | 369/75.1 |
| 4,937,771 | 6/1990 | Rumps, Jr. et al. | 369/75.1 |
| 4,937,806 | 6/1990 | Babson et al. | 369/75.1 |
| 4,941,841 | 7/1990 | Darden et al. | 369/75.1 |
| 4,960,384 | 10/1990 | Singer et al. | 361/391 |
| 5,036,313 | 7/1991 | Lin et al. | 361/380 |
| 5,045,960 | 9/1991 | Eding | 360/137 |
| 5,067,041 | 11/1991 | Cooke et al. | 361/393 |

FOREIGN PATENT DOCUMENTS 2-71478  3/1990  Japan .................................. 369/77.1

OTHER PUBLICATIONS

IBM Tech. Disc. Bull – v.27 #7B – Dec. 1984.
IBM Tech Disc Bull – v.28 #9 – Feb. 1986.
IBM Tech. Disc. Bull. – v.28 #12 – May 1986.

Primary Examiner—Stuart S. Levy
Assistant Examiner—Kevin M. Watkins
Attorney, Agent, or Firm—Ronald P. Kananen

[57] ABSTRACT

In a mounting device for mounting a first electronic device having a first box shape in a space of a second electronic device having a second box shape which is larger than the first box shape. The mounting device includes first and second chassis mounted in the space for the second electronic device, the first and the second chassis having shapes formed by dividing a space portion formed when the first electronic device is arranged in the second box shape by two, whereby it is able to be miniaturized and light weight to improve efficiency of transportation as kit parts.

4 Claims, 2 Drawing Sheets

MOUNTING DEVICE FOR MOUNTING A SMALL ELECTRONIC DEVICE IN A SPACE FOR A LARGER ELECTRONIC DEVICE

BACKGROUND OF THE INVENTION

The present invention relates to a mounting device, and more particularly is adaptable to using, for example, in mounting a 3.5 inch floppy disc device in a space for a 5 inch floppy disc device.

In a compact computer, instead of a 5 inch floppy disc (also commonly referred to as a 5¼ inch floppy disc) as a magnetic disc for storing program and data, a 3.5 inch floppy disc which is more compact and more convenient in transportation and storage has been utilized.

For this, there is a mounting device which mounts in a space for a 5 inch floppy disc device on a compact computer to mount a 3.5 inch floppy disc device.

In such case, as shown in FIG. 1, the 3.5 inch floppy disc device 1, after being mounted on a mounting device 2, is mounted on a compact computer similarly to the 5 inch floppy disc.

This mounting device 2 is constituted with a 5 inch chassis 3 having the same size as that of a box shape excluding an upper panel of a 5 inch floppy disc device, a front panel 4 having the same size as that of a front panel of a 5 inch floppy disc device and a relay substrate 5 for converting a connector of the 3.5 inch floppy disc device 1 into a connector of the 5 inch floppy disc device and leading out it.

Practically, the 5 inch chassis 3 has a bottom plane portion 6 and side plane portions 7 and 8 all of which correspond to a box size of the 5 inch floppy disc device and are formed integrally of a plate metal, and, in the bottom plane portion 6, protrusions 6A, 6B, 6C and 6D are cut up for mounting the 3.5 inch floppy disc device 1 at a predetermined position matched to mounting holes formed in a bottom plane of the 3.5 inch floppy disc device 1.

In flat portions of upper ends of the protrusions 6A, 6B, 6C and 6D, through-holes 9A, 9B, 9C and 9D are formed and, by disposing the 3.5 inch floppy disc device 1 with the mounting holes of the bottom plane being matched with the through-holes 9A, 9B, 9C and 9D, first, and then screwing screws 10A, 10B, 10C and 10D from a rear plane of the bottom plane portion 6 as shown by arrows a, b, c and d, it is made that the 3.5 inch floppy disc device 1 is mounted to the 5 inch chassis 3.

Further, in the side plane portions 7 and 8 of the 5 inch chassis 3, thread holes 7A, 7B, 7C, 7D and 8A, 8B, 8C, 8D are formed for mounting the 5 inch chassis 3 to a compact computer and substantially rectangular shaped engaging holes 7E and 8E are formed for engaging the front panel 4.

Practically, the front panel 4 is an integral mold of resin and, in a panel portion, an insertion window opening 4A and a lever opening 4B which correspond, in shape, to a floppy insertion window 1A and a floppy deriving lever 1B provided in the front panel of the 3.5 inch floppy disc device 1, respectively, and in both sides of the panel portion, engaging nails 4C and 4D are formed.

Therefore, by inserting the front panel 4 to the 5 inch chassis 3 on which the 3.5 inch floppy disc device 1 is mounted as shown by arrows e and f and by making the engaging nails 4C, 4D engaged with the engaging holes 7E and 8E of the side plane portions 7 and 8, it is made that the front panel 4 is mounted to the 5 inch chassis 3.

By this, the 3.5 inch floppy disc can be inserted through the insertion window opening 4A of the front panel 4 at which time a floppy deriving lever 1B protrudes into the deriving lever opening 4B of the front panel 4.

By depressing the floppy deriving lever 1B protruded, the 3.5 inch floppy disc pops out in the insertion window opening 4A, by which it is made possible to derive the 3.5 inch floppy disc.

Further, on the relay substrate 5, a connector 5A for connection to a connector disposed on a rear plane of the 3.5 inch floppy disc device 1 is disposed and this connector 5A and a 5 inch connector pattern portion 5B formed in a rear end portion of the substrate are connected by a wiring pattern 5C.

By this, the relay substrate 5 is mounted to the 5 inch chassis 3 by engaging the connector 5A with the connector of the 3.5 inch floppy disc device 1 and screwing screws 11A, 11B into thread holes 6E, 6F of the 5 inch chassis 3 through the through holes 5D, 5E formed in the relay substrate 5 as shown by arrows h and i.

By mounting the 3.5 inch floppy disc device 1 to the mounting device 2 in such manner, it is made possible to mount the 3.5 inch floppy disc device easily in a space which is constituted, in outer configuration and electrically, similarly to the 5 inch floppy disc device and has the 5 inch floppy disc device of a compact computer mounted.

However, in the mounting device having such construction in which the 5 inch chassis 3 is formed with a plate metal having similarly outer configuration to that of the 5 inch floppy disc device, there is a problem that the size is large and the weight increases.

Further, in addition to this, in a case where the 5 inch chassis 3, the front panel 4 and the relay substrate 5 of the mounting device 2 are to be transported as kit parts, there is a problem that the transportation efficiency is bad, since it is necessary to package them with a member whose size is similar to that of the 5 inch floppy disc device and a corresponding space is required.

SUMMARY OF THE INVENTION

In view of the foregoing, an object of this invention is to provide a mounting device which is capable of overcoming the conventional problems totally, is compact and light weight and can be transported as parts with high efficiency.

The foregoing object and the other objects of the invention have been achieved by the provision of a mounting device 20 which is adapted to mount a first electronic device 1 having a first box shape in a space for a second electronic device having a second shape which is larger than the first box shape, the mounting device 20 comprises a first and a second chassis 21A and 21B having shapes provided by dividing a space portion formed when the first electronic device t is arranged in the second box shape by two, and the first and the second chassis 21A, 21B are mounted on the first electronic device 1 and the first electronic device 1 is mounted in the space for the second electronic device.

By shaping the first and second chassis 21A and 21B in the forms which are formed by dividing a space portion produced when the first electronic device a space disposed in the second box shape of the second electronic device by two, it can be made compact and light weight and it is possible to improve efficiency when it is transported as kit parts.

The nature, principle and utility of the invention will become more apparent from the following detailed descrip-

DETAILED DESCRIPTION OF THE INVENTION

Figure 1:
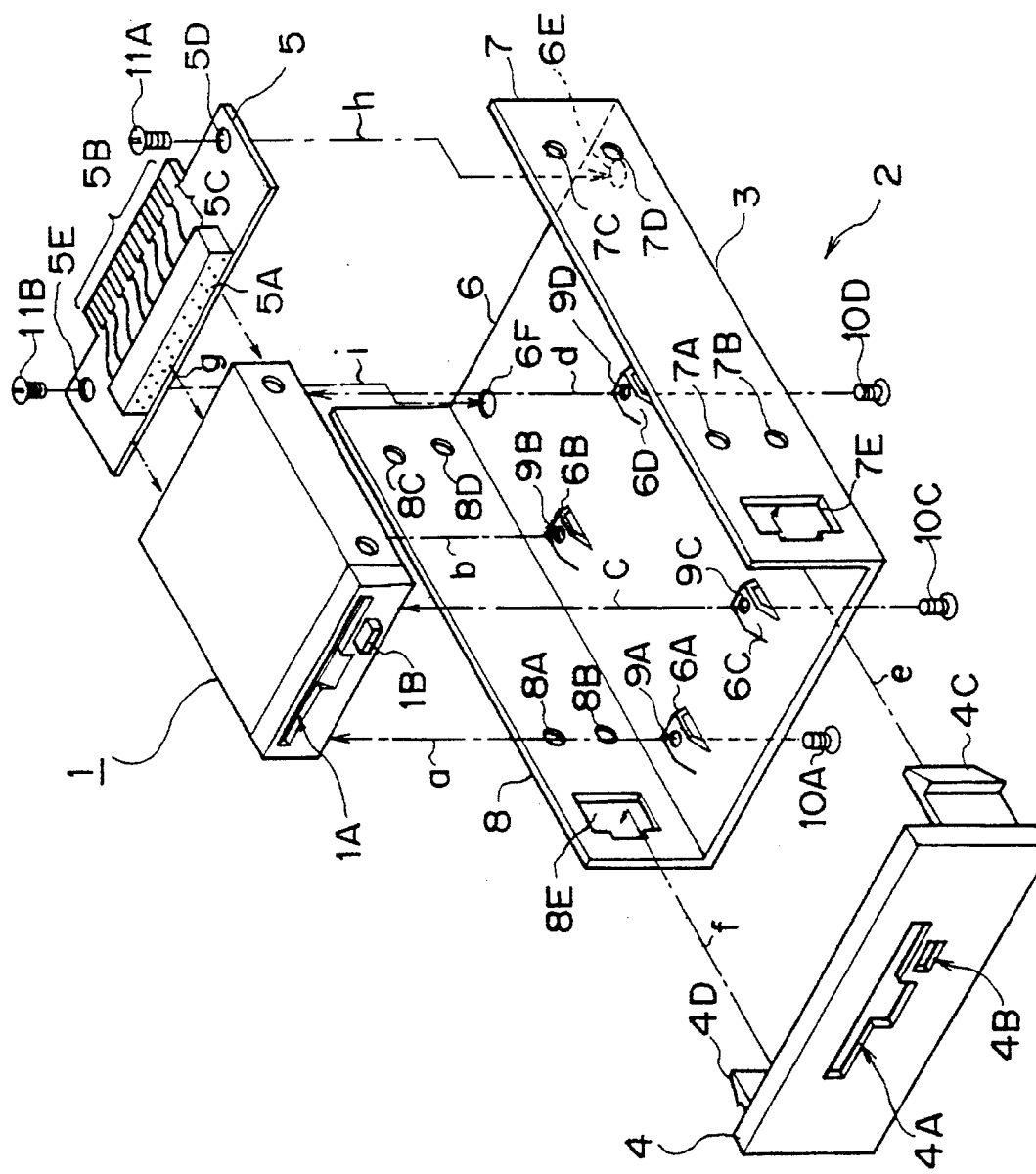
FIG. 1 is a disassembled perspective view of a conventional mounting device.
Figure 2:
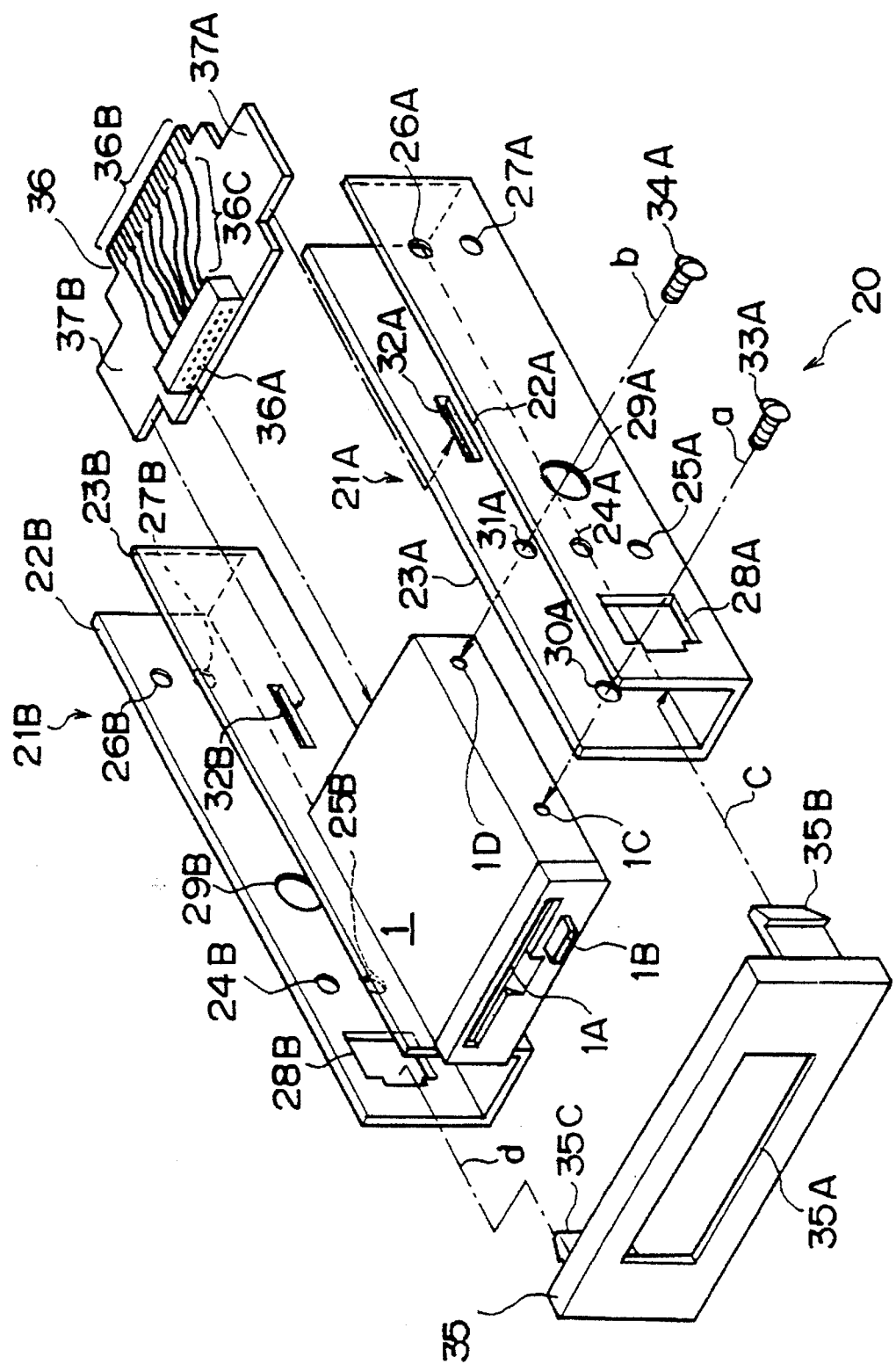
FIG. 2 is a disassembled perspective view of a mounting device according to an embodiment of the present invention.

Preferred embodiments of this invention will be described with reference to the accompanying drawings:

In FIG. 2 in which corresponding portions to those shown in FIG. 1 are depicted by the same reference numerals, 20 shows a mounting device according to the present invention as a whole, in which instead of a 5 inch chassis 3, splitted chassis 21A, 21B are used.

The chassis 21A and 21B are respectively formed by plate metal angle members having U shaped cross section, which is constituted such that its width direction has a size which is a half of a space produced in a side plane when it is assumed that a 3.5 inch floppy disc device 1 is disposed in a box of a 5 inch floppy disc device and depth direction has a similar size to that of a depth of the 5 inch floppy disc device.

The chassis 21A and 21B have outer wall portions 22A and 22B and inner wall portions 23A and 23B in a state where they are mounted on the floppy disc device 1. In the outer wall portions 22A and 22B, thread holes 24A, 25A, 26A, 27A and 24B, 25B, 26B, 27B are formed and panel engaging holes 28A and 28B are formed as rectangular openings and, further, through-holes 29A and 29B through which screws for mounting the chassis 21A and 21B to the 3.5 inch floppy disc device 1 are formed.

In the inner wall portions 23A and 23B, throughholes 30A, 31A and 30B, 31B for screws for mounting the chassis 21A and 21B to the 3.5 inch floppy disc device 1 are formed and, rearwardly thereof, groove holes 32A and 32B for mounting a substrate are formed.

By this, by disposing the chassis 21A and 21B in such a way that the through-holes 30A, 31A and 30B, 31B of the inner wall portions 23A and 23B correspond, in position, to mounting thread holes 1C, 1D, 1E and 1F of side wall portions of the 3.5 inch floppy disc device and then screwing screws 33A, 34A, 33B and 34B through the engaging holes 28A and 28B and the through-holes 29A and 29B of the outer wall portions 22A and 22B as shown by arrows a and b, the chassis 21A and 21B are mounted to both side portions of the 3.5 inch floppy disc device 1.

Further, a front panel 35 is an integral mold of resin similarly to the conventional and has an opening 35A having a shape corresponding to the front panel of the 3.5 inch floppy disc device 1 and engaging nails 35B and 35C are formed in both sides of the panel portion.

Therefore, it is constituted such that the front panel 35 is mounted by inserting it in directions shown by arrows c and d in a state where the chassis 21A and 21B are mounted on the both side portions of the 3.5 inch floppy disc device 1 and mating the engaging nails 35B and 35C with the engaging holes 28A and 28B of the chassis 21A and 21B.

At this stage, in the opening 35A of the front panel 35, the front panel of the 3.5 inch floppy disc device 1 protrudes, with which it is possible to operate a floppy insertion window 1A and a floppy deriving lever 1B similarly to a case where the 3.5 inch floppy disc device 1 is used independently and to execute an insertion and deriving of a 3.5 inch floppy disc reliably.

A connector 36A is arranged on a relay substrate 36 and is engaged with a connector disposed on a rear plane of the 3.5 inch floppy disc device 1 similarly to the conventional. This connector 36A is connected with a 5 inch connector pattern portion 36B formed in a rear end portion of the substrate through a wiring pattern 36C.

In the case of this embodiment, engaging protrusions 37A and 37B are formed on both sides of the relay substrate 36, and the relay substrate 36 makes the connector 36A engaged with the connector of the 3.5 inch floppy disc device 1. By inserting the engaging protrusions 37A and 37B into the groove holes 32A and 32B formed in the inner wall portions 23A and 23B of the chassis 21A and 21B for mounting the substrate, it is possible to mount it reliably to the chassis 21A and 21B with a simple and easy construction which does not use screws, etc.

By mounting the 3.5 inch floppy disc device 1 to the mounting device 20 in this manner, it is possible to constitute it similarly, in outer configuration and electrically, to the 5 inch floppy disc device and thus it is possible to mount it easily within a space in which a 5 inch floppy disc device of a compact computer is mounted in a similar manner to the 5 inch floppy disc device.

In the case of the mounting device 20 of this embodiment, by constituting the chassis 21A, 21B with the plate metal angle members having U shaped cross section, which is constituted such that its width direction has a size which is a half of a space produced in a side plane when it is assumed that a 3.5 inch floppy disc device 1 is disposed in a box of a 5 inch floppy disc device and depth direction has a similar size to that a depth of the 5 inch floppy disc device, it is possible to reduce the outer configuration size and weight compared with the conventional 5 inch chassis 3.

In addition to this, in a case where the chassis 21A and 21B, the front panel 5 and the relay substrate 36 of the mounting device 20 are to be transported as kit parts, it is possible to package them with a much smaller member compared with that of the conventional 5, improving the transportation efficiency correspondingly.

According to the construction mentioned, it is possible to realize the mounting device 20 which is compact and light weight and capable of being transported as parts efficiently, by constituting the chassis 21A and 21B with the plate metal angle members having U shaped cross section, which is constituted such that its width has a half of a space produced in a side plane when it is assumed that a 3.5 inch floppy disc device 1 is disposed in a box of a 5 inch floppy disc device and depth is similar size to that a depth of the 5 inch floppy disc device.

In the embodiment mentioned above, although the chassis has been described as being formed by the plate metal angle member having U shaped cross section, it is not limited thereto and the chassis may be formed in various configurations so long as it has a shape which divides the space produced when a 3.5 inch floppy disc device is arranged in a box of a 5 inch floppy disc device by two.

Further, although, in the embodiment mentioned above, signal of a 3.5 inch floppy disc device is converted into signal for a 5 inch floppy disc device by means of a relay substrate, it is not limited there to and it is possible to use, for example, signal line or power source line instead of relay substrate correspondingly to an interface of a compact computer on which a 5 inch floppy disc device is mounted.

Further, in the embodiment mentioned above, although the present invention has been described as applied to the mounting device for mounting a 3.5 inch floppy disc device in a space for a 5 inch floppy disc device, the present invention is not limited thereto and is widely applicable to a mounting for mounting a first electronic device having a first box shape in a space for a second electronic device having a second box shape which is larger than the first shape.

As mentioned above, according to the present invention, it is possible to realize a mounting device which is compact and light weight and capable of improving efficiency of transportation as kit parts, by providing a first and a second chassis having shapes formed by dividing a space portion formed when a first electronic device is arranged in a second box shape by two, mounting the first and the second chassis on the first electronic device and mounting the first electronic device in the space for the second electronic device.

While there has been described in connection with the preferred embodiments of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A mounting device for mounting a first electronic device having a first box shape in a space for a second electronic device having a second box shape which is larger than said first box shape, comprising:

a space portion defined as the sum of the distances between outer sides of said first box shape and sides of said second box shape when said first electronic device is mounted in said space;

first and second chassis members each having a width equal to half of said space portion; and wherein said first electronic device is mounted to said first and said second chassis members by a plurality of fastening members extending through mounting holes in said first and second chassis members into opposite sides of said first electronic device, and said first and second chassis members having means for mounting said members within said space for said second electronic device;

said first and second chassis members each being formed by a respective angle member having a U-shaped cross-section with a pair of vertical wall portions and a horizontal portion connecting said vertical wall portions, an inner one of said vertical wall portions of each chassis member being mounted on a respective side wall of said first electronic device and an outer one of said vertical wall portions of each chassis member being mounted in said space instead of said second electronic device;

wherein groove holes are formed at rear portions of the inner vertical wall portions of said first and second chassis members, and a relay substrate is mounted on said first and second chassis members by inserting engaging protrusions formed on both sides of said relay substrate into the groove holes, said relay substrate having a first connector engaged with a connector disposed on a rear plane of said first electronic device and a second connector which is formed in a rear end portion of said relay substrate and is connected with the first connector.

2. A mounting device for mounting a relatively small electronic device in a space for a larger electronic device, comprising;

a pair of elongated chassis members extending from front to rear on either side of said small electronic device;

a relay substrate mounted to a rear portion of said chassis members for electrically coupling said small electronic device; and wherein said chassis members each have a generally U-shaped cross-section with a pair of vertical side-wall portions and a horizontal portion connecting said vertical side-wall portions, and mounting hole means provided in each of said vertical side-wall portions for mounting said small electronic device to said chassis members and for mounting said chassis members within said space for said larger electronic device;

wherein each of said chassis members further include a slot located on an inner one of said vertical side-wall portions for receiving mounting protrusions extending outwardly from said relay substrate.

3. The mounting device according to claim 2, wherein a front panel member is mounted to front portions of said chassis members.

4. The mounting device according to claim 3 wherein each of said chassis members include an engaging hole in an outer one of said vertical side-wall portions for receiving a pair of rearwardly extending engaging portions of said front panel member.

* * * * *